Figure 1:
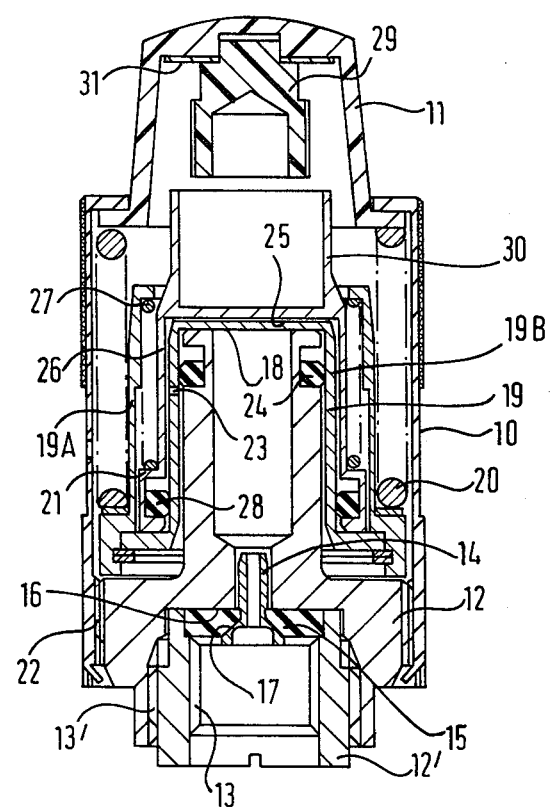

United States Patent [19]

Pegram

[11] 4,362,121
[45] Dec. 7, 1982

[54] PRESSURE INDICATOR FOR PNEUMATIC TIRES

[75] Inventor: Philip H. Pegram, Leamington Spa, England

[73] Assignee: Dunlop Limited, London, England

[21] Appl. No.: 176,685

[22] Filed: Aug. 8, 1980

[30] Foreign Application Priority Data

Aug. 15, 1979 [GB] United Kingdom ............... 7928399

[51] Int. Cl.³ .............................................. B60C 23/04
[52] U.S. Cl. .................................. 116/34 R; 116/266
[58] Field of Search ............... 73/146; 116/34 R, 272

[56] References Cited

U.S. PATENT DOCUMENTS

| 4,045,768 | 8/1977 | Klimek | 116/266 X |
| 4,067,376 | 1/1978 | Barabino | 116/266 X |
| 4,174,673 | 11/1979 | Tung | 116/34 R |

FOREIGN PATENT DOCUMENTS

| 926592 | 4/1955 | Fed. Rep. of Germany . |
| 2012535 | 3/1970 | France . |
| 242564 | 11/1925 | United Kingdom . |
| 760208 | 10/1956 | United Kingdom . |
| 1127067 | 9/1968 | United Kingdom . |
| 1412023 | 10/1975 | United Kingdom . |
| 1443956 | 7/1976 | United Kingdom . |
| 1479946 | 7/1977 | United Kingdom . |
| 1509893 | 5/1978 | United Kingdom . |
| 1547653 | 6/1979 | United Kingdom . |

*Primary Examiner*—Robert I. Smith
*Attorney, Agent, or Firm*—Stevens, Davis, Miller & Mosher

[57] ABSTRACT

The invention provides a deflation warning device for a pneumatic tire which gives a clear, positive indication of a predetermined pressure loss by the exposure of a brightly colored element within a transparent dome, all moving parts of the device being fully enclosed and protected against the ingress of dirt and corrosion by a housing.

The element is either masked or unmasked by an opaque shield mounted on a piston which is biased by a spring to unmask the element but can be displaced by tire pressure acting on its surface to mask the element.

In preferred embodiments of the invention the piston is located between the inner and outer parts of a second piston which is in turn responsive to tire pressure acting on its upper surface.

10 Claims, 2 Drawing Figures

PRESSURE INDICATOR FOR PNEUMATIC TIRES

This invention relates to a deflation warning device for a pneumatic tire and more particularly to a small and compact device which can be mounted on a wheel and tire assembly so as to be in communication with the air chamber of the tire, e.g. by being screwed onto the type inflation valve or into a bore in the wheel rim, and when so positioned will give a visual indication of the prevailing pressure condition of the tire.

More particularly, the device of the invention is intended to give a clear visual indication of a dangerous, low pressure condition. Such a device is of course useful for all pneumatic tires, but whereas a visual warning of low pressure of a tire may not be considered essential on a motor vehicle it is highly desirable on an aircraft tire where partial deflation of one of a large number of tires may have the most dangerous consequences during take off and landing. Checking each individual tire with a pressure gauge is a laborious and time consuming operation during which it is easy for one of a number of tires to be overlooked. Furthermore the partially deflated condition of a single tire may not be noticed if it is masked by adjacent tires on a multi-wheel bogie.

There is presently available a device in the form of an individual pressure gauge which can be mounted on the inflation valve of a tire to give a constant reading of tire pressure, but of necessity the gauge is small and not easily read from a distance. Reading the gauge requires observing the position of a needle on a scale and an untrained or careless operator could easily misread or overlook a dial showing too low a reading.

Various proposals have been made in the past for giving audible, electronic or visual warnings of the low pressure state of a tire but all have suffered drawbacks which it is the object of the present invention to avoid. Most prior art devices have been costly and cumbersome and those which rely on a simple, mechanical actuation of an indicator have not been adequately protected against deterioration, over a period of use, due to the ingress of dirt or corrosion causing them to be unreliable in operation.

A principal object of the present invention is to provide a cheap, small, compact device which will reliably give a clear visual signal over a prolonged period of use, its moving parts being enclosed within a housing which at all time protects them from dirt and corrosion.

In its simplest form the device of the invention comprises a housing adapted to be placed in communication with the air chamber of a pneumatic tire, a piston reciprocable in the housing, the piston being biased in one direction and movable against said bias by tire air pressure and a visual indicator enclosed within the housing which is visible therein through a transparent portion of the housing when the piston is in a first position but is masked from view when the piston is in a second position.

As described in the previous paragraph the visual indicator, for example a brightly coloured element, might be masked by an opaque portion of the piston so long as tire pressure remains at a given value and become visible if tire pressure falls below that value, causing the piston to move under its bias to a position where the element becomes visible through the housing window. Alternatively the brightly coloured element might be integral and movable with the piston, being visible through a window of the housing so long as tire pressure remains at a given value and becoming invisible through descent of the piston under its bias if tire pressure falls below that value.

Such arrangements depending on movement of a single piston, for example biased by a spring, would be useful in giving a coarse measurement of tire pressure but it is desirable that the device should respond positively to variation of pressure within a narrow range so that a dangerous low pressure condition of a tire is clearly and accurately indicated, avoiding the danger that operators would come to ignore an indicator known to give an imprecise reading.

An object of a preferred embodiment of the invention is to provide a device which will respond positively to a pressure variation within a narrow range so that operators will be confident that a warning indication by the device accurately reflects a predetermined pressure condition of the tire.

In accordance with a preferred embodiment of the invention, therefore, communication of the said first-mentioned piston with tire air pressure to displace the same from its first to its second position is controlled by a second piston reciprocable in the housing, the second piston being biased in one direction and movable against said bias by tire air pressure, the second piston controlling valve means which alternatively communicates the first piston with tire air pressure, when the latter has displaced the second piston against its bias, or with atmosphere when the second piston is moved in said one direction by its bias.

The said valve means preferably comprises at least one port in the second piston movable therewith to opposite sides of a seal stationary with respect to the housing, on one side of the seal the port communicating with a passageway in the housing communicable with tire air pressure and on the other side of the seal the port communicating with an air vent route through the housing.

The port is preferably formed in an annular wall of the second piston which surrounds a tubular portion of the housing defining said passageway and having said seal recessed into its outer periphery, said annular wall having a closed end defining a chamber for pressurized air acting on the second piston, which chamber is communicable via the port with the first piston when the port is on said one side of the seal.

Said annular wall of the second piston preferably has, at a position spaced from said closed end thereof, an outwardly extending flange engaged by one end of a compression spring the other end of which reacts against a fixed part of the housing.

Said annular wall of the second piston is preferably of enlarged internal diameter at a position spaced from the port and on the side thereof remote from said closed end, the arrangement being such that if the second piston is sufficiently displaced against its bias the enlarged internal diameter portion of the second piston will provide a path whereby pressurized air in the chambers of the first and second pistons may by-pass said seal on said tubular portion to escape from the housing via said air vent route.

Sealing means may be arranged to close said air vent route when the second piston reaches a limit position thereof under the influence of its biasing means, and said sealing means may comprise a second seal recessed into the outer periphery of said tubular portion at a position spaced from said first-mentioned seal and arranged to be engaged by the open end of the annular wall when the second piston reaches a limit position under the influence of the biasing means.

The first piston preferably has an annular wall surrounding the second piston and a closed end which defines a chamber for pressurized air admitted thereto through the port and sealing means is preferably provided between the first and second pistons at a position spaced from said closed end of the first piston to prevent the escape of pressurized air from said first piston chamber between the pistons. The first piston is preferably reciprocably located between inner and outer parts of the second piston and the first piston is preferably biassed by a compression spring which reacts between respective shoulders of the first piston and of the outer part of the second piston.

Figure 2:
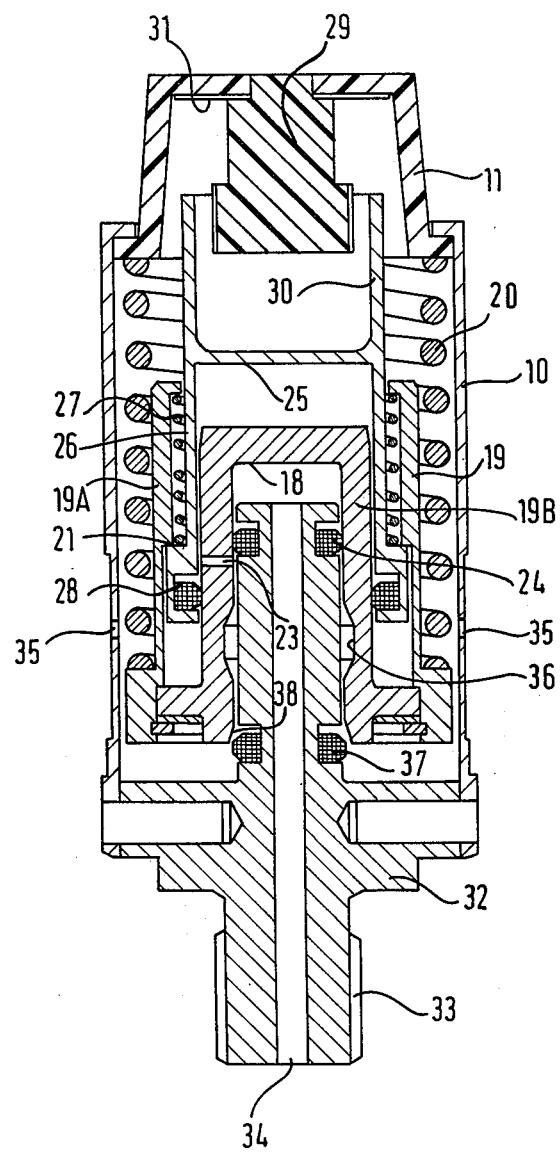

Preferred embodiments of the invention will now be described with reference to the accompanying drawings, in which FIGS. 1 and 2 are sectional elevations of two devices in accordance with the invention.

The device illustrated in FIG. 1 comprises a cylindrical metal housing 10 having at its upper end a transparent dome 11 e.g. of a transparent plastics material. The lower end of the housing 10 is plugged by a body 12 which is internally screw-threaded at 13' to receive a ring 12' which in turn has an internal thread 13 to enable the device to be mounted on the external screw threads of the inflation valve (not shown) of a pneumatic tire. In the stepped, internal bore of the body 12 is a tubular metal insert 14 arranged to contact and depress the pip of the inflation valve, the insert 14 being surrounded by a seal 15 of rubber or the like elastomeric material which is engaged between the step 16 of the bore in the body 12 an a frusto-conical surface 17 of the insert 14, the arrangement being such that the metal insert 14 will only depress the pip of the tire inflation valve if the device has been screwed onto the inflation valve sufficiently to deform the seal 15 so that the insert 14 is extruded from the narrower diameter part of the bore of the body 12 toward the pipe of the inflation valve, thereby placing the interior of the device in communication with the air chamber of the tire. The arrangement of the metal insert 14 and rubber seal 15 ensures that the tire valve will not be opened until it is in sealing engagement with the seal 15.

When the device is fully screwed onto the inflation valve of a pneumatic tire air pressure within the tire acts on the under surface 18 of a piston 19 which is biassed by a compression spring 20 to the position shown. The piston 19 comprises outer and inner parts 19A and 19B between which an annular space accommodates a piston 26. One or more small bores 23 in the piston 19 are so positioned that they are below a sealing ring 24 recessed into the body 12 when the lower end of the piston assembly 19 rests on the top of the body 12 under the influence of the spring 20, but when air pressure from the tire acting on the surface 18 of the piston 19 is great enough to raise the piston 19 against the action of the spring 20 sufficiently to raise the bore 23 above the seal 24 the air pressure of the tire is communicated via the bore 23 with the underside 25 of a piston 26, which is guided for movement on the inner portion 19B of the piston 19 and biassed toward the plug 12 by a second compression spring 27 which reacts between the outer portion 19A of the piston and a step 21 of the piston 26. The setting of the second spring 27 is much lighter than that of the first spring 20 and as soon as the piston 26 is communicated with compressed air from the tire by the bore 23 rising above the seal 24 air pressure in the chamber defined by the underside 25 of the piston 26 and a seal 28 recessed into the piston 26 and rubbing against the inner part 19B of the piston 19 the piston 26 is caused to rise relative to the piston 19 against the bias of the spring 27.

Located inside the cap or dome 11 is a brightly coloured element 29 which gives a visual indication or warning when it is visible through the transparent dome 11. The element 29 may be of brightly coloured metal or a plastics material. When the second piston 29 rises from the position shown it carries with it an annular shield 30 which, when it reaches the top of the dome 11, fully masks the element 29 from view.

The drawing shows the positions of the parts before the device is mounted on an inflation valve or if the tire pressure is too low to raise the piston 19 sufficiently for the bore 23 to be above the seal 24. The tire pressure at which this will occur is determined with accuracy by the setting of the spring 20. Whenever the bore 23 is above the seal 24 the piston 26 is raised so that the element 29 is fully masked by the shield 30 but as soon as tire pressure falls below the value predetermined by the setting of the spring 20 so that the bore 23 passes below the seal 24 compressed air is dumped from the chamber defined by the underside 25 of the piston 26 and seal 28 through the bore 23 and, by-passing the seal 24 is allowed to escape to atmosphere e.g. through the screw threads 22 by which the body 12 is held in the housing 10, or through a suitable escape hole (not shown) in the housing 10. As the underside 25 of the piston 26 becomes subject only to atmospheric pressure the spring 27 rapidly returns it to the position shown where the element 29 is unmasked by the shield 30 giving a clear, visual warning.

The device illustrated in FIG. 2 resembles that of FIG. 1, and like parts have like reference numerals. The device differs, however, in that the bottom end of the housing 10 is closed by a plug 32 which is externally threaded at 33 to be screwed into a hole tapped in a wheel rim (not shown) so that a coaxial passageway 34 in the plug 32 will communicate the air chamber of a pneumatic tire mounted on the rim with the underside 18 of the piston 19.

The device of FIG. 2 is further modified in three other respects;

Air vent apertures 35 are provided for the exhaust of compressed air from the housing 10 when the chamber defined by the underside 25 of the piston 26 and the part 19B of the piston 19 is communicated with the interior of the housing by the bore or bores 23 passing below the seal 24.

Further the device of FIG. 2 has means to prevent over-inflation of an associated tire and means to prevent complete deflation of the tire via the device if its seal 24 should fail. The means to prevent over-inflation comprises an annular recess 36 in the inner periphery of the part 19B of the piston 19 so positioned that it will come into alignment with the seal 24 when the spring 20 is sufficiently compressed. This sets an upper limit to the inflation pressure of the tire because when the recess is aligned with the seal 24 it provides a path for air in the bore 34 to by-pass the seal 24 and discharge to atmosphere through the openings 35.

On the other hand, an additional seal 37 recessed into the plug 32 is so positioned that it will co-operate with the slightly flared bottom end 38 of the part 19B of the piston 19 when pressure acting on the surface 18 is so low that the spring 20 is able fully to extend within the limits imposed upon downward displacement of the piston 19. When the surface 38 is in contact with the seal 37 it cuts off the air escape route between the bore 34 and the openings 35.

Among the advantages of the devices described and illustrated are that:

(a) All moving parts of the device are enclosed within the housing 10 and dome 11 and thus protected from corrosion and the ingress of dirt.

(b) The dual piston arrangement, the piston 26 being subject to its own biasing spring 27, ensures that the visual indicator 29 is either fully masked or fully unmasked in response to a pressure change within a narrow pressure range so that the indication given by the device is not progressive over a broad pressure range but gives a clear and positive indication that tire pressure has fallen below a predetermined, safe value, and (c) The friction of the seals 24 and 28 is compensated by the spring 27 which need be only a light spring with limited extensibility since it moves with the piston 19 and whatever the position of the latter the only work required of the spring 27 is to control the position of the piston 26 relative to the piston 19. Upward movement of the piston 19, and therefore maximum compression of the spring 20, is limited by abutment of the outer piston part 19A with the base of the dome 11, while upward movement of the piston 26 is limited by the shield 30 contacting the top of the dome 11, where a gasket 31 is provided. It will be appreciated that such upward movement of the piston 26, with consequent compression of spring 27, only occurs after it has already been raised jointly with the piston 19.

Having now described my invention what I claim is:

1. A deflation warning device for a pneumatic tire comprising a housing adapted to be placed in a communication with the air chamber of a pneumatic tire; a piston reciprocable in the housing, the piston being biased in one direction and moveable against said bias by tire air pressure; a brightly colored visual indicator enclosed within the housing which when is visible therein through a transparent portion of the housing when the piston is in a first position but is masked from view when the piston is in a second position and an annular, opaque mask moveable with the piston to move into or out of said housing portion to mask or unmask the colored element.

2. A deflation warning device for a pneumatic tire comprising a housing adapted to be placed in communication with the air chamber of a pneumatic tire and two pistons individually reciprocable in the housing, respective biasing means biasing each piston in one direction and means for communicating each piston with tire air pressure whereby it is displaceable against the bias, movement of a first of said pistons producing a visual indication of a predetermined change in tire pressure wherein communication of the said first piston with tire air pressure to displace the same against its bias is controlled by said second piston, said communicating means comprising valve means controlled by the second piston which alternatively communicates the first piston with tire air pressure, when the latter has displaced the second piston against its bias, or with atmosphere when the second piston is moved in said one direction by its bias.

3. A device as claimed in claim 2, wherein the said valve means comprises at least one port in the second piston moveable therewith and a seal stationary with respect to the housing, the port being moveable with the second piston to opposite sides of the seal, on one side of the seal the port communicating with a passageway in the housing communicable with tire air pressure and on the other side of the seal the port communicating with an air vent route through the housing.

4. A device as claimed in claim 3, wherein the port is formed in an annular wall of the second piston which surrounds a tubular portion of the housing defining said passageway and having said seal recessed into its outer periphery, said annular wall having a closed end defining a chamber for pressurized air acting on the second piston, which chamber is communicable via the port with the first piston when the port is on said one side of the seal.

5. A device as claimed in claim 4, wherein said annular wall of the second piston has, at a position spaced from said closed end thereof, an outwardly extending flange engaged by one end of a compression spring the other end of which reacts against a fixed part of the housing.

6. A device as claimed in claim 4, wherein said annular wall of the second piston is of enlarged internal diameter at a position spaced from the port and on the side thereof remote from said closed end, the arrangement being such that if the second piston is sufficiently displaced against its bias the enlarged internal diameter portion of the second piston will provide a path whereby pressurized air in the chambers of the first and second pistons may by-pass said seal on said tubular portion to escape from the housing via said air vent route.

7. A device as claimed in claim 5, wherein sealing means is arranged to close said air vent route when the second piston reaches a limit position thereof under the influence of its biasing means.

8. A device as claimed in claim 7, wherein said sealing means comprises a second seal recessed into the outer periphery of said tubular portion at a position spaced from said first-mentioned seal and arranged to be engaged by the open end of the annular wall when the second piston reaches a limit position under the influence of the biasing means.

9. A device as claimed in claim 2, wherein the first piston has an annular wall surrounding the second piston and a closed end which defines a chamber for pressurized air admitted thereto by said valve means and wherein sealing means is provided between the first and second pistons at a position spaced from said closed end of the first piston to prevent the escape of pressurized air from said first piston chamber between the pistons.

10. A device as claimed in claim 9, wherein the first piston is reciprocably located between inner and outer parts of the second piston and wherein the first piston is biased by a compression spring which reacts between respective shoulders of the first piston and of the outer part of the second piston.

* * * * *